Nov. 11, 1930.  J. RANDALL  1,781,301
APPARATUS FOR CLEANING EDIBLE ANIMAL FISSURES
Filed Oct. 7, 1927   2 Sheets-Sheet 1

INVENTOR
John Randall
BY
Richey Watts
HIS ATTORNEYS

Nov. 11, 1930.   J. RANDALL   1,781,301
APPARATUS FOR CLEANING EDIBLE ANIMAL FISSURES
Filed Oct. 7, 1927   2 Sheets-Sheet 2

INVENTOR
John Randall
BY
Richey & Watts
HIS ATTORNEYS

Patented Nov. 11, 1930

1,781,301

UNITED STATES PATENT OFFICE

JOHN RANDALL, OF CLEVELAND, OHIO

APPARATUS FOR CLEANING EDIBLE ANIMAL TISSUES

Application filed October 7, 1927. Serial No. 224,548.

My invention is an improvement in apparatus for cleaning edible animal tissues, such as beef casings and the like.

One of the objects of my invention is to thoroughly clean edible animal tissue by scrubbing the same in a container movable in a body of cleaning fluid.

Another object of my invention is to provide a simple apparatus for cleaning edible animal tissues thoroughly, efficiently and quickly in a sanitary manner by providing means for carrying off matter which has been detached from the tissues.

Other objects and advantages of my invention will become more apparent as the following description of one embodiment thereof progresses, reference being made to the accompanying drawings in which like reference characters are employed to designate like parts throughout the same.

Figure 1:
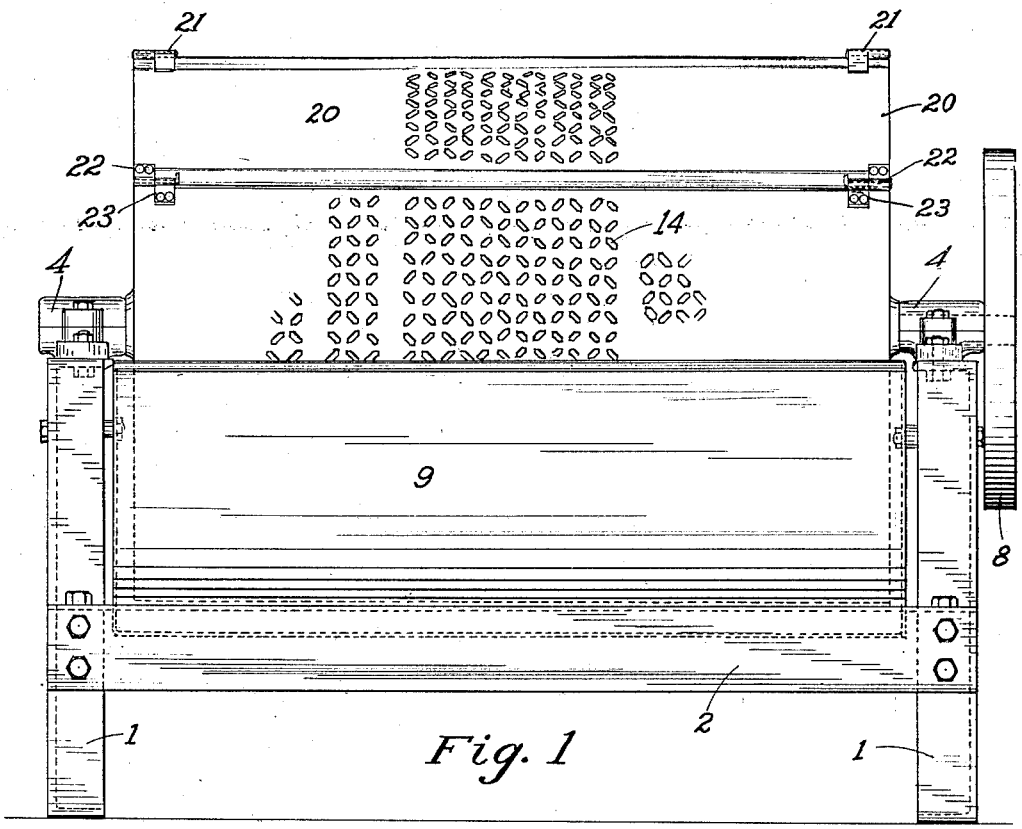
Figure 1 is an elevation of an apparatus embodying my invention.

In carrying out my invention one embodiment of which is illustrated in the accompanying drawings, I provide a support comprising standards 1, spaced apart by means of rails 2. The rails are secured at their ends to the respective standards 1 by means of suitable bolts 3. The standards 1 are provided with suitable split bearings 4 for rotatably supporting the trunnions 5 secured to the end pieces 6 of the drum 7. A pulley 8 is keyed to one of the trunnions 5 to rotate therewith and is connected to a suitable source of power by means of a belt or the like (not shown).

The drum 7 is supported to rotate partly submerged in a cleaning fluid tank or container 9. This container 9 rests upon the support and is provided with a drain 10 whereby the cleaning fluid and foreign matter may be drawn from the tank 9. A supply pipe 11 having a suitable control valve 12 extends into the tank 9 and admits cleaning fluid such as a suitable mixture of lime and water to the tank, when the valve is open. The outlet 10 may be provided with a cut-off valve $10^a$ to permit draining of the tank at desired intervals. I may operate the apparatus by continuously feeding cleansing fluid through the conduit 11 into the tank and draining the fluid from the tank through the outlet 10 at substantially the same rate at which the fluid is supplied to the same, thus providing a circulation in the tank and assuring sanitary conditions therein over an extended period of time.

Figure 4:
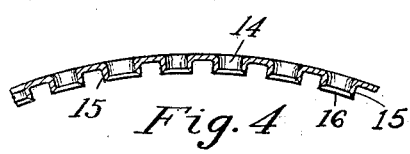
Figure 4 is an enlarged fragmentary section of a portion of the drum.

I have provided a receptacle for edible animal tissues such as beef casings, which is rotatably supported upon the frame 1 and which may be rotated, partly submerged in a tank of suitable cleaning materials. This receptacle is in the form of a drum 7 having suitable end pieces 6 to which are secured trunnions 5 for supporting the drum. The drum is preferably constructed of sheet metal perforated over the greater part of its area, as at 14. These perforations are preferably of the shape illustrated in Figures 4 and 7 and are arranged in rows about the periphery of the drum. Certain of the perforations are formed in rows substantially at right angles to certain other rows of perforations. This is clearly illustrated in Figures 1, 4 and 7. The perforations are preferably formed so that a portion of the metal defining the walls of the perforations is bent inwardly of the drum as is shown more particularly in Figure 4. It will be noted that the bent in portions 15 are provided with rather sharp edges 16 which are formed when the sheet comprising the drum 7 is perforated, as by punching.

Figure 7:
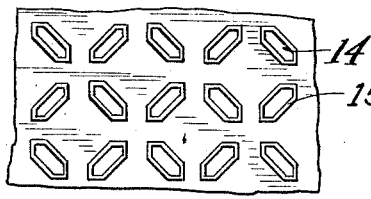
Figure 7 is an enlarged fragmentary inside plan view of a portion of the drum.

In Figure 7, I have shown in enlarged detail a fragmentary section of a part of the drum 7 showing the preferred form of openings 14. Although I have shown in Figure 1 only a portion of the drum 7 as being perforated it is to be understood that the entire drum surface may be perforated in the manner described. I have provided means whereby beef casings and other elongated articles introduced into the interior of the drum, by providing a cover 20 secured to the drum by suitable latches or the like 22. The cover may be removed entirely for cleaning the drum or for inserting or removing articles from the interior of the drum. The cover is also perforated in a manner similar to the drum. Although I have shown the cover 20 as extending substantially the full length of the drum it is obvious that I may provide a cover which is adapted to close an opening at any point intermediate the ends of the drum.

Figure 5:
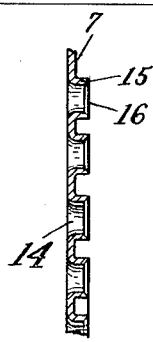
Figure 5 is an enlarged fragmentary section of a portion of one of the drum end plates.

The end plates 6 are also preferably perforated in a manner similar to that of the drum material 7. In Figure 5 I have shown in enlarged cross section a portion of one of the end plates showing the perforations 14 and the inturned portions 15 having the relatively sharp scraping or scrubbing edges 16.

I have provided means within the drum for dividing the drum into compartments for receiving and holding a quantity of beef casings of various lengths, the shorter lengths being preferably placed in the compartment 26ª. This means consists in providing a plurality of perforated walls 25 dividing the drum into vertical compartments 26. Each of the walls 25 is perforated throughout substantially its entire length thereby permitting the free passage of cleansing fluid through the drum from one compartment to the other but preventing the passage of the casings from one compartment to the other.

Figure 6:
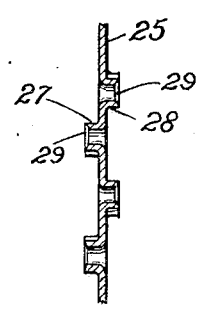
Figure 6 is an enlarged fragmentary section through one of the dividing walls within the drum.
Figure 8:
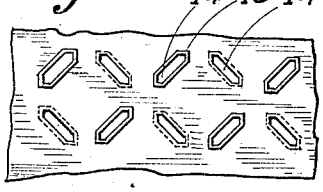
Figure 8 is an enlarged fragmentary plan view of a portion of one of the compartment walls.

In Figure 6 I have illustrated in enlarged sectional detail the manner of perforating the divisions 25. It will be noted that the walls 25 are perforated in some respects similar to the drum wall 7 and the end plates 6, that is, the perforations are arranged in rows and certain of the rows are disposed at substantially right angles to certain other rows. The perforations are formed in such a manner, as by punching out portions from opposite sides of the wall 25, to cause portions of the metal adjacent the openings to extend substantially at right angles to the plane of the wall 25, and on opposite sides thereof. This is illustrated at 27 and 28 of Figure 6. Each of the inclined portions 27 and 28 are provided with relatively sharp scraping and scrubbing edges 29. It will be noted that with this arrangement the walls adjacent the perforations running in parallel rows extend on one side of the wall 25 while the walls adjacent the perforations formed in the parallel rows extending substantially at right angles to the other rows extend from the other side of the wall 25. In this manner casings within adjacent compartments are acted upon by the protruding metal of the compartment walls. In Figure 8 this arrangement is shown in plan view.

Figures 2, 3:
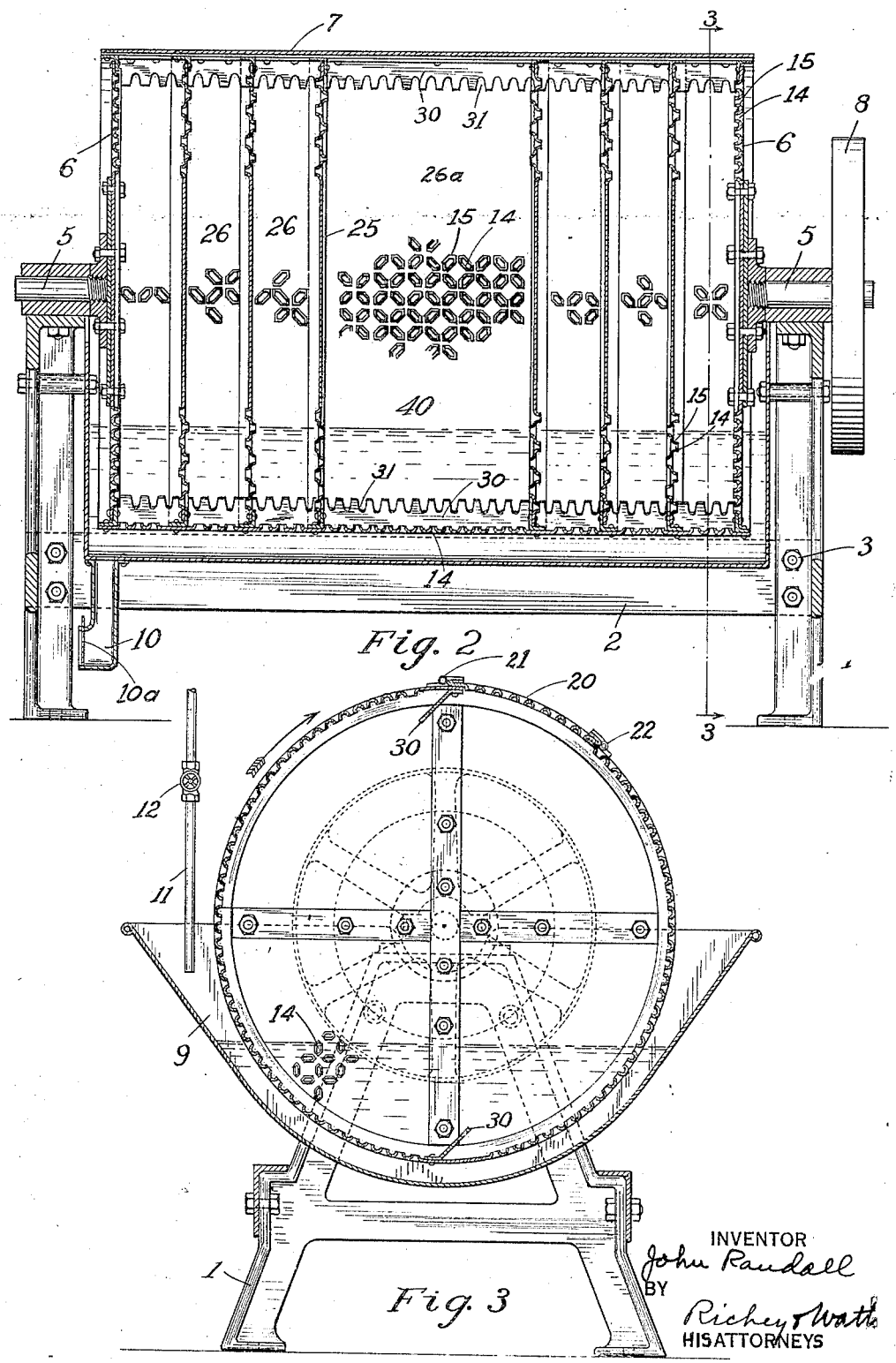
Figure 2 is a lonigtudinal section through the apparatus.
Figure 3 is a section on line 3—3 of Figure 2.

I have provided means for preventing the tangling of the casings within the various compartments which consists in providing longitudinal strips 30 toothed as at 31, the strips being secured to the drum 7, while the toothed portion of the strips are bent inwardly of the drum as shown in Figure 3. The teeth 31 project into the several compartments of the drum and engage the casings within these compartments as the drum is rotated permitting the casings to slide between adjacent teeth and thereby arranging the casings substantially circumferentially of the drum.

In operation the embodiment of my invention illustrated in the accompanying drawings operates as follows:

Suitable cleansing fluid, preferably comprising a mixture of lime and water is supplied to the tank 9 through the conduit 11 until the level reaches the approximate position shown in Figure 2. The cover 20 is removed and the operator inserts a quantity of casings into the several compartments 26 through the opening in the drum. The longer casings are preferably placed in the several compartments 26 while the shorter casings or bungs are placed in the central compartment 26ª. When the desired number of casings are placed in the several compartments the cover 20 is closed and latched as at 22 and power is applied through the pulley 8 to rotate the drum. I find that casings are cleaned most efficiently when rotating the drum at from 30 to 40 revolutions per minute, the speed being varied however, according to the diameter of the drum. As the drum rotates, the casings, which have previously been turned wrong side out, are brought into contact with the rough edges 16 formed on the inturned portions 15 adjacent the perforations, whereupon the walls of the casings will be subjected to a thorough scraping, abrasive and/or scrubbing action in the presence of the cleansing fluid. It will be noted that the drum wall 7, the partition walls 25 and the end pieces 6 are all perforated thus permitting free access of the fluid within the tank 9 to the interior of the drum and in contact with the beef casings within the drum. It is essential during the operation of the apparatus that the beef casings be subjected to a continuous scrubbing or scraping action such as is provided by the large areas defining the several compartments. During the rotation of the drum the casings of the various compartments will be prevented from tangling to such a degree as to hinder the cleaning of the casings since they will be confined to a substantial circumferential position and movement within a compartment. The toothed portions of the strips 30 which extend into each of the compartments also materially aid in preventing tangling of the casings within these compartments. As the drum continues to rotate and the casings are subjected to the scrubbing and scraping action of the sharp edges 16 of the bent portions 15, the materials which have been detached from these beef casings will be carried off by the fluid through the perforations in the drum, the end plates, and the compartment plates 25, and will enter the tank 9 and may be drawn out through the drain 10 to a suitable container. After the drum has been allowed to rotate for a desired period of time during which the casings within the drum are thoroughly cleaned, and all the undesirable material has been detached therefrom, the drum is rotated until the cover is in the approximate position shown in Figure 3, whereupon the latches 22 are released and the cover is removed. The operator now may reach into the various compartments and withdraw the cleaned casings, or if desired the drum may be rotated at approximately 90 degrees so that the opening is within more easy reach of the operator. After the casings have been removed and the drum and container 9 are flushed out additional casings may be placed in the various compartments of the drum and the operation repeated.

Beef casings and the like which have been treated in the above manner will be found to be thoroughly cleaned, washed and detached from all undesirable tissue.

The apparatus herein described is of simple construction and is easy to operate, the operator's attention not being required after the casings have been placed in the compartments and the cover closed and the drum is started rotating, until it is desired to remove the casings from the interior of the drum.

Various changes may be made in the details of construction of my invention without departing from the spirit of the invention or the scope of the appended claims.

I claim:

1. An apparatus of the class described comprising a rotatable container for the material to be cleaned, means to rotate the container in a body of cleaning fluid and a plurality of walls in the container for dividing the container into a plurality of compartments, said walls being perforated and having roughened material engaging surfaces.

2. An apparatus of the class described comprising a rotatable container for the material to be cleaned, means to rotate the container in a body of cleaning fluid and a plurality of walls in the container for dividing the container into a plurality of compartments, said walls being perforated and having roughened material engaging surfaces, the inner walls of the container being roughened for engagement with the materials to be cleaned.

3. An apparatus for cleansing elongated articles comprising a rotatable container for the articles and means to rotate the container in a body of cleaning fluid, the inner walls of the container having roughened surfaces for subjecting the elongated articles to a scrubbing action and means within the container to prevent tangling of the elongated articles during the cleansing operation.

4. An apparatus for cleansing elongated articles comprising a rotatable container for the articles and means to rotate the container in a body of cleaning fluid, the inner walls of the container having roughened surfaces for subjecting the elongated articles to a scrubbing action and toothed strips extending longitudinally of the container to prevent tangling of the articles during rotation of the container.

5. An apparatus for cleansing elongated articles comprising a rotatable container for the articles and means to rotate the container in a body of cleaning fluid, the inner walls of the container having roughened surfaces for subjecting the elongated articles to a scrubbing action, and a plurality of walls within the container dividing the same into a number of article receiving compartments, the surfaces of the walls having portions extending substantially longitudinally of the container for engagement with the articles in the compartments.

6. In a device of the character described, the combination with a perforated drum and means for rotating the drum in a body of cleaning fluid, of a plurality of compartments formed in said drum and means to prevent tangling of the articles placed in said compartments during the rotation of the drum, said last named means comprising toothed strips within the various compartments arranged for engagement with the articles to be cleaned.

7. In a device of the character described, the combination with a perforated drum and means for rotating the drum in a body of cleaning fluid, of a plurality of compartments formed in said drum and means to prevent tangling of the articles placed therein, the walls of said compartments being perforated to permit the passage of cleansing fluid from one compartment to another, the edges of adjacent perforations being bent alternately on opposite sides of said compartment walls and into adjacent compartments to subject the articles therein to the scraping action of the said edges when the drum is rotated.

In testimony whereof I hereunto affix my signature this 5th day of October, 1927.

JOHN RANDALL.